United States Patent [19]

Balko et al.

[11] 4,208,258

[45] Jun. 17, 1980

[54] METHOD FOR THE RECOVERY OF MERCURY AND OTHER HEAVY METAL IONS FROM A LIQUID STREAM

[76] Inventors: Edward N. Balko, 3231 Maxwell Ave., Trenton; Shyam D. Argade, 22341 Foxcroft Rd., Woodhaven, both of Mich. 48183

[21] Appl. No.: 910,560

[22] Filed: May 30, 1978

Related U.S. Application Data

[63] Continuation of Ser. No. 742,737, Nov. 17, 1976, abandoned.

[51] Int. Cl.² .............................................. C25C 1/16
[52] U.S. Cl. .................................................. 204/130
[58] Field of Search ........................................ 204/130

[56] References Cited

U.S. PATENT DOCUMENTS

| | | | |
|---|---|---|---|
| 3,102,085 | 8/1963 | Edwards et al. | 204/130 |
| 3,457,152 | 7/1969 | Maloney, Jr. et al. | 204/130 |
| 3,899,404 | 8/1975 | Iverson | 204/130 |
| 3,899,405 | 8/1975 | Iverson et al. | 204/130 |
| 3,915,822 | 10/1975 | Veltman | 204/130 |
| 3,970,531 | 7/1976 | Recht | 204/130 |

*Primary Examiner*—R. L. Andrews

[57] ABSTRACT

Small quantities of metal ions can be removed from an aqueous solution by subjecting the solution to an electric current in the presence of an anode and a fibrous metal cathode. The invention also provides an electrolytic apparatus having such electrodes. The process is particularly adaptable to the removal of mercury contamination from liquid brine streams.

4 Claims, 2 Drawing Figures

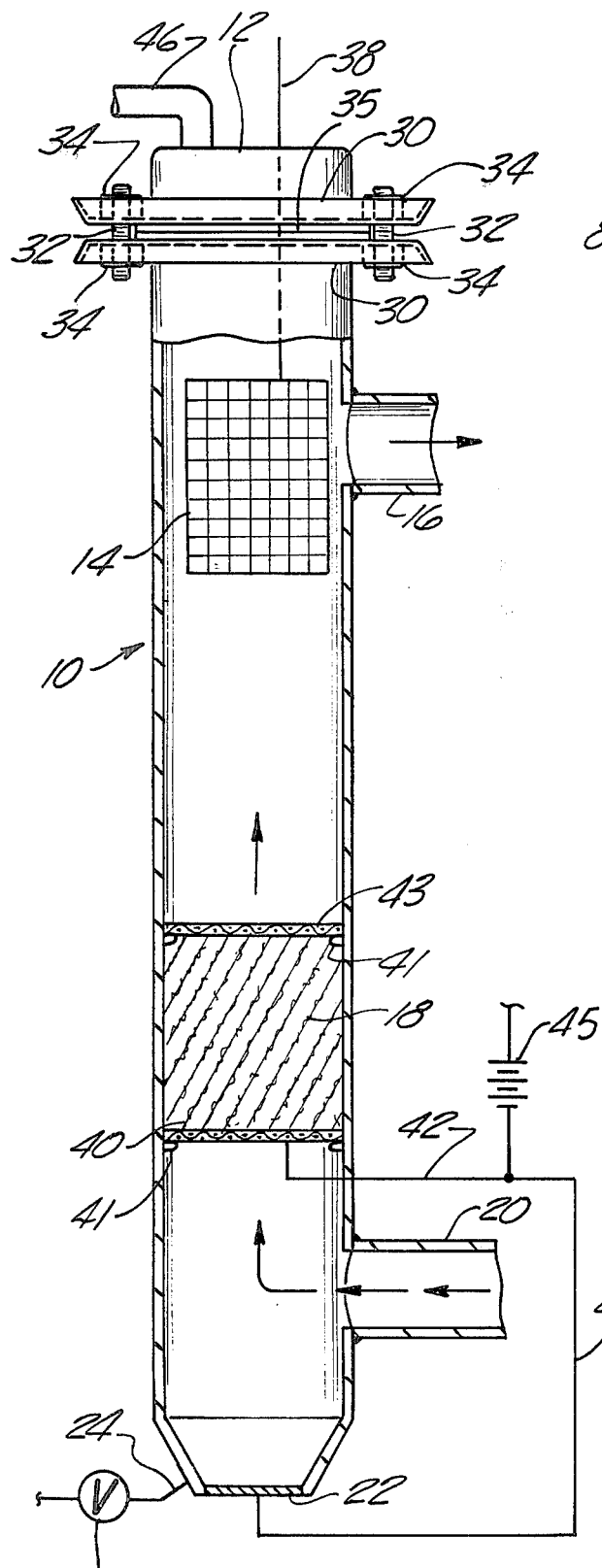
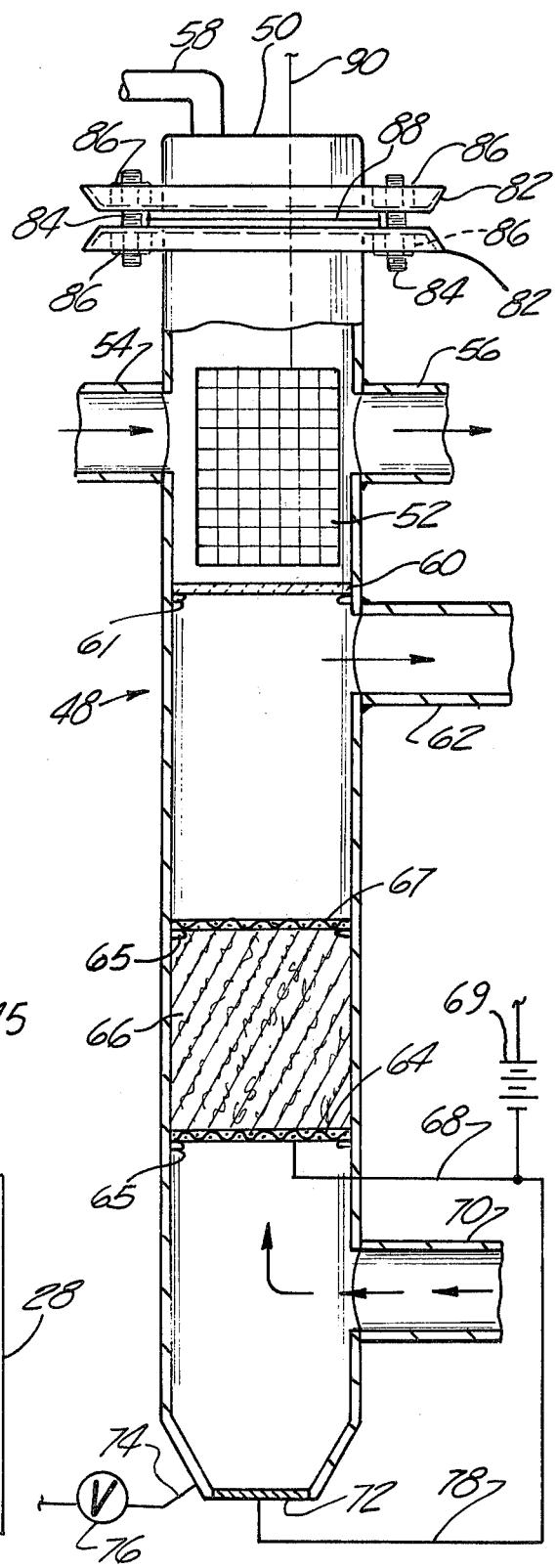

METHOD FOR THE RECOVERY OF MERCURY AND OTHER HEAVY METAL IONS FROM A LIQUID STREAM

This is a continuation of application Ser. No. 742,737, filed Nov. 17, 1976, now abandoned.

BACKGROUND OF THE INVENTION

1. Field of the Invention

This invention relates to a process for removing small quantities of dissolved metal ions from an aqueous solution and the apparatus for employing such process.

2. Description of the Prior Art

The mercury type electrolytic cell for the production of chlorine has been used primarily because of the high grade caustic soda which is produced. However, recently the loss of mercury from the electrolytic cells into the waste streams has created ecological problems. Thus, not only is the loss of mercury a costly expenditure in the chlorine producing field but it is also desirable to reduce the loss of mercury for ecological reasons. Accordingly, it is imperative that means be found for the removal of mercury and/or other heavy metal ions from liquid streams.

U.S. Pat. No. 2,563,903 describes a process for the deposition of gold or silver employing charred excelsior as a cathode surface. U.S. Pat. No. 3,003,942 discloses a cell for the recovery of silver from spent photographic fixing baths employing stainless steel as a cathodic material. U.S. Pat. No. 3,457,152 discloses the use of lead shot cathodes to remove trace quantities of metals from solutions. It is also known in the prior art that fibers can be coated with an impervious smooth uniform sheet of metal, the fibers then being bonded together by fusion at spaced points to the metal sheet. These metal sheets can then be employed as electrodes for electrolytic devices. Nothing in the prior art, however, discloses the use of fibrous metals for the electrolytic recovery of small quantities of metal ions from a liquid stream or, more specifically, the removal of small quantities of mercury ions.

SUMMARY OF THE INVENTION

In accordance with this invention there is provided a method for the removal of small quantities of metal ions from a liquid stream by electrolytic reduction comprising a process and apparatus employing a cathode which is comprised of conductive fibers.

BRIEF DESCRIPTION OF THE DRAWING

FIG. 1 is an elevational view partially in section of an electrolytic cell in accordance with the present invention employing a single electrolyte stream.

FIG. 2 is an elevational view partially in section of an electrolytic cell in accordance with the present invention employing two separate electrolyte streams.

DESCRIPTION OF THE PREFERRED EMBODIMENT

The removal of small quantities of metal ions from a liquid stream by electrolytic reduction is complicated by the mass transport of the metal ions to the electrode surface where the actual reduction occurs. The quantities of trace metal which, it is contemplated, would be removed employing the apparatus of this invention can range from less than 1 part per million to 10,000 parts per million but on a practical basis the apparatus is particularly adaptable to a range of from about 5 to about 1,000 parts per million. In conventional cell design with planar electrodes, a long residence time in the cell and rigorous agitation of the liquid stream are necessary for efficient removal of the dissolved metal ions from the liquid stream.

In this preferred embodiment the electrolytic apparatus comprises
  (a) a liquid containing means having liquid inlet means and liquid outlet means,
  (b) an anode,
  (c) a cathode bed comprised of conductive fibers, and
  (d) electrical means connected to said anode and cathode for passage of a direct current between said anode and cathode.

The stream, containing the metal ions which it is desired to remove, is forced through the bed while a direct current is passing through the apparatus. Metal ion reduction occurs at the cathode and the metal is deposited on the fibers of the cathode.

The fibers may consist of any metal or alloy fiber but for greatest current efficiency a material with high hydrogen overvoltage is desirable. In the preferred embodiment of this invention lead fibers are used. Such a bed has a high internal surface area to volume ratio and the number of intersecting flow channels within it provide turbulent mixing within the electrode. The bed of fibrous material has several advantages over a bed of particles such as granules, spheres, and so forth. The latter depend on particle-to-particle contact for electrical continuity. The actual cross-sectional area of such a contact is generally very small and can lead to a high internal resistance through the bed. In a bed of fibers the electrical path is along the fiber which is a path of much lower resistance and thus to a much lesser degree is dependent on fiber-to-fiber contact. High internal resistance in a cathode bed leads to poor current distribution and thus will decrease the efficiency of the bed. A particulate bed also has a tendency to settle with time, opening voids and permitting channeling through the bed and further increasing the internal resistance. A bed of entangled fibers has a far less tendency to settle and will be considerably more stable with time. The fiber length employed may range from about 0.01 times the length of the bed to about four times the length of the bed. This means the fiber may be of one continuous length which is folded back upon itself within the fiber bed. Generally, to be most effective it is preferred that the fiber length range from 0.1 times the length of the bed to one that is equal to the length of the bed.

The accompanying drawing illustrates the embodiments of the invention which together with the description serve to explain the principles of the invention. The drawing is a schematic diagram of the apparatus for carrying out the process of the invention. In FIG. 1, the apparatus comprises a cell body 10, having a top 12 connected at flanges 30 to body 10 by adjustable spacer bolts 32 and nuts 34. A gasket 35 may be employed to ensure a gas tight seal. Such a gasket may be constructed of rubber or other inert pliable material. Cell body 10 may be constructed of glass, polypropylene, polyvinylchloride and other inert materials. The bottom of cell body 10 is provided with metal plate 22, outlet 24 and outlet valve 26. Metal plate 22 may be constructed of a non-corroding metal such as titanium. An electrical conductor 28 is connected to metal plate 22 to allow the imposition of a negative charge thereonto.

Cell body 10 is provided with both a liquid inlet pipe 20 and a liquid outlet pipe 16.

Cathode 18 is supported by screen 40. Screen 40 is supported by nubs 41 projecting from cell body 10. Cathode 18 may be constructed of lead or other metallic fibers. Screen 40 may be constructed of conductive or non-conductive material such as lead or polypropylene fibers. Screen 43 is similar to screen 40 and rests on nubs 41. Screen 40 and 43 may be mounted on nubs 41 by any conventional means. Anode 14 is located substantially at the point of the liquid outlet pipe. The anode may be of DSA construction. Cathode 18 and anode 14 are connected electrically through conductor 42 and conductor 38, respectively, to battery 45 or another potential source. Top 12 is provided with gas outlet 46.

Another embodiment of the invention is illustrated by FIG. 2. The apparatus comprises a cell body 48 having a top 50 connected at flanges 82 to body 48 by adjustable spacer bolts 84 and nuts 86. A gasket 88 is provided to ensure a good seal. Gasket 88 may be rubber or other inert material. Cell body 48 may be constructed of glass or other inert materials. The bottom of cell body 48 is provided with metal plate 72, outlet 74, and outlet valve 76. Metal plate 72 may be constructed of a non-corroding metal such as titanium. An electrical conductor 78 is connected to metal plate 72 to allow the imposition of a negative charge thereonto.

Cell body 48 is provided with both a liquid inlet pipe 70 and liquid outlet pipe 62. Additionally, liquid inlet pipe 54 and liquid outlet pipe 56 are provided for the anode 52 portion of the cell.

Cathode 66 is supported by screen 64. Screen 64 is supported by nubs 65 projecting from cell body 48. Screen 64 may be constructed of conductive or non-conductive material such as lead or polypropylene fibers. Screen 67, similar to screen 64, rests on nubs 65 and may be mounted thereon by any conventional means. Cell separator 60 is located just above the liquid outlet pipe 62 and rests on nubs 61. Cell separator 60 rests on nubs 61 which project from cell body 48 and may be mounted by any conventional means. Separator 60 may be composed of porous glass, porous ceramic, porous polymeric membranes, or ion exchange membranes.

Anode 52 may be of DSA construction. It is located in such a position that it is in the path of the liquid flow from inlet pipe 54 to outlet pipe 56.

Cathode 66 and anode 52 are connected electrically through conductor 68 and conductor 90, respectively, to battery 69 or another potential source. Top 50 is provided with gas outlet 58.

The apparatus of FIG. 1 may be employed as a single pass system or the stream may be recycled until the desired amount of impurities has been removed. Aqueous salt solutions contaminated with mercury may be purified flowing through the fiber bed past the DSA type anode forming a continuous electrical path. DSA type anodes are well known to those skilled in the art and do not require any further explanation. When a NaCl solution is being purified, chlorine is evolved at the surface of the anode and leaves the cell through the gas outlet while the sodium which forms at the cathode reacts with water to form sodium hydroxide. The lower section of the cell acts as a collection point for any metallic mercury which might leave the fiber bed under the force of gravity. The metal plate is maintained at a negative potential to prevent re-oxidation of the mercury. As the amount of mercury collects at the bottom of the cell it may be drawn off as desired. Other impurities which may be removed from aqueous streams include soluble salts of cadmium, zinc, antimony and tin. These other metals would, of course, remain on the cathode.

The apparatus of FIG. 2 may be used advantageously to recycle the contaminated electrolyte stream until the desired level of metal concentration is achieved. This cell is operated with a separator such as a diaphragm or membrane. The contaminated aqueous salt solution flows through the cathodic fiber bed. A separate flow of electrolyte is maintained past the anode. As both the electrolyte flowing through the fiber bed and that flowing past the anode are in contact with the separator, a continuous electrical path is formed. When a NaCl solution is employed at the anode, chlorine would be evolved. This particular embodiment may be used for removal of small quantities of metals from those solutions wherein the reduction products at the cathodic fiber bed were soluble or the anodic products were not gaseous and readily separable. This apparatus can, however, also be used with a gas evolving anode. Provisions are also made at the lower section of the cell for removing metallic mercury, if this is the trace metal which is the contaminant.

The cell currents, which are employed in the apparatus of either FIG. 1 or FIG. 2, are dependent upon the concentration of the metal it is desired to remove from the solution, the flow rates employed, and the metal oxidation state. For example, in a single pass application at a 5 mg/liter concentration of divalent mercury and a 5 ml/min/in$^2$ area of cathode bed flow rate, a minimum 24 ma/in$^2$ of bed current would be required. At the same concentration of mercury and a 200 ml/min/in$^2$ area of cathode bed flow rate, a minimum current of 960 ma/in$^2$ of bed would be required. If the concentration of mercury is 1,000 mg/liter and a flow rate of 5 ml/min/in$^2$ area of cathode bed is employed, the minimum current requirement would be 4.8 amp/in$^2$ of bed. At a 200 ml/min/in$^2$ area of cathode bed, a minimum current of 192 amp/in$^2$ of bed would be needed.

It is also contemplated that the diameter of the fibers employed as cathode can range from about 40 to about 1,000 microns. The optimum range would be from about 100 to about 1,000 microns. The fibers should then be packed in the bed so that the void volume of the bed ranges from about 30 to about 90 percent with an optimum range of about 50 to about 80 percent.

The temperature ranges which may be employed are from about 5° C. to about 98° C. The optimum is from about 20° C. to about 80° C.

The electrolyte concentrations can range from very dilute to saturated solutions. The minimum concentration is one which would be sufficient to reduce the resistance of the solution. For solutions of sodium chloride, the NaCl concentration can range from about 6 to about 30 weight percent.

The following examples are illustrative of the present invention and, therefore, are not intended in any way as a limitation thereof. Parts and percents are by weight unless otherwise indicated. These examples illustrate the utility of both the apparatus and the process for the removal of small quantities of mercury.

EXAMPLE 1

A 15% aqueous solution of sodium chloride containing 450 ppm of mercury in the form of salts was passed through the apparatus of the embodiment shown in FIG. 1. This apparatus had an annular diameter in the fibrous bed of 3.8 cm. and a bed length of 20.3 cm. The lead fiber in the bed had diameters of 0.388 mm. ±0.06 mm. The void volume of the bed was 77.6%. The lead fiber length ranged from 5 to 15 cm. The apparatus was operated at a current of 300 ma, a temperature range of 22°–30° C. at essentially atmospheric pressure. The data of Table I shows the percentage of mercury removal at various flow rates.

Table I

| Flow Rate ml/minute | % Hg Removal |
|---|---|
| 51.4 | 90 |
| 47.5 | 93.5 |
| 46 | 94.3 |
| 24 | 97.3 |

EXAMPLE 2

A 15% aqueous solution of sodium chloride containing 410 ppm of mercury was electrolyzed under conditions similar to Example 1 employing the apparatus of Example 1 at a current of 300 ma. The temperature ranged from 24°–27° C. The results obtained are shown in Table II below.

Table II

| Flow Rate ml/minute | Concentration of $Hg^{+2}$ Entering Bed, ppm | Concentration of $Hg^{+2}$ Leaving Bed, ppm | % Hg Removal |
|---|---|---|---|
| 100 | 35 | 5 | 86 |
| 138 | 90 | 15 | 83 |
| 930 | 25 | 15 | 40 |
| 1040 | 15 | 10 | 33 |
| 1476 | 45 | 25 | 44 |
| 2400 | 160 | 110 | 31 |

EXAMPLE 3

A 15% aqueous solution of sodium chloride containing 565 ppm mercury was electrolyzed using the apparatus of Example 1. The flow rate was maintained at a constant 200 ml/minute and the stream was recycled through the apparatus at essentially atmospheric pressure. The entire system has a 6-liter capacity. The current employed was 200 ma and the temperature ranged from 22°–31° C. The results obtained are shown in Table III.

Table III

| Time, minutes | Mercury, ppm | % Hg Removal |
|---|---|---|
| 0 | 565 | 0 |
| 58 | 95 | 83 |
| 100 | 14 | 97 |
| 165 | 3 | 99.5 |
| 210 | 2 | 99.6 |

The embodiments of the invention in which an exclusive property or privilege is claimed are defined as follows:

1. A process for removing small amounts of mercury from an aqueous electrolyte solution containing sodium chloride which comprises the steps of
    recycling said solution through a chamber while subjecting the solution to the action of a direct current maintained between an anode and a cathode bed both located above the lower portion of the chamber,
    said cathode bed being below the anode and comprised of conductive fibers extending throughout a complete cross-section of the chamber,
    whereby dissolved mercury is electrodeposited from said solution in the cathode bed and drops therefrom by gravitational force,
    collecting mercury in the bottom of said chamber, and periodically removing the mercury from the bottom of the chamber.
2. The process of claim 1 wherein the mercury is collected on an auxiliary cathode at the bottom of the chamber whereby reoxidation of the metallic mercury is prevented.
3. The process of claim 1 wherein said conductive fibers are composed of lead.
4. The process of claim 1, wherein a separator is provided between the anode and the cathode bed.

* * * * *

UNITED STATES PATENT AND TRADEMARK OFFICE
CERTIFICATE OF CORRECTION

PATENT NO. : 4,208,258
DATED : June 17, 1980
INVENTOR(S) : Edward N. Balko and Shyam D. Argade It is certified that error appears in the above-identified patent and that said Letters Patent are hereby corrected as shown below:

Assignee: BASF Wyandotte Corporation
Wyandotte, Mich.

Signed and Sealed this

Thirtieth Day of September 1980

[SEAL]

Attest:

SIDNEY A. DIAMOND

*Attesting Officer*  *Commissioner of Patents and Trademarks*